(12) United States Patent
Murthy et al.

(10) Patent No.: US 6,602,319 B1
(45) Date of Patent: Aug. 5, 2003

(54) PROCESS FOR THE RECOVERY OF GOLD AND SILVER FROM USED REFRACTORY BRICKS

(75) Inventors: Daita S. R. Murthy, Jamshedpur (IN); Vinod Kumar, Jamshedpur (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/112,053

(22) Filed: Apr. 1, 2002

(51) Int. Cl.⁷ ................................. C22B 11/00
(52) U.S. Cl. .................... 75/427; 75/428; 75/634; 75/636
(58) Field of Search ............. 75/427, 428, 634, 75/635, 636

(56) References Cited

U.S. PATENT DOCUMENTS

| | | |
|---|---|---|
| 2,837,406 A | 6/1958 | Schaufelberger |
| 4,404,022 A | 9/1983 | Godbehere |
| 4,581,064 A * | 4/1986 | Morrison et al. ............. 75/631 |

OTHER PUBLICATIONS

Murthy et al, "Leaching of Gold and Silver from Miller Process Dross Through Non–Cyanide Leachants", Hydrometallurgy, Elsevier Scientific Publishing CY. Amsterdam, NL., vol. 42, No. 1 Aug. 1, 1966, paes 27–33, XP004040677.

Ed. Fathi Habashi: "Handbook of Extractive Metallurgy", 1997, Wiley–VCH, Germany XP002220010, pp. 1190–1194, pp. 1225–1226, pp. 1230–1231.

* cited by examiner

*Primary Examiner*—Melvyn Andrews
(74) *Attorney, Agent, or Firm*—Nixon & Vanderhye P.C.

(57) ABSTRACT

The present invention relates to a process for the recovery of gold and silver from the used refractory bricks of Dore furnace. This invention particularly relates to a process for the recovery of gold and silver from the used refractory bricks generated during the processing of the anode slimes of copper industry, through a non-cyanide route. The invention is useful for gold producing, gold refining and copper producing industries.

7 Claims, No Drawings

PROCESS FOR THE RECOVERY OF GOLD AND SILVER FROM USED REFRACTORY BRICKS

FIELD OF THE INVENTION

The present invention relates to a process for the recovery of gold and silver from used refractory bricks. More particularly, the present invention relates to a process for the recovery of gold and silver from the used refractory bricks of Dore bricks of Dore furnace. The invention also relates to a process for the recovery of gold and silver from the used refractory bricks generated during the processing of the anode slimes of copper industry, through a non-cyanide route. The invention will be useful for gold producing, gold refining and copper producing industries.

BACKGROUND OF THE INVENTION

Usually when copper metal is produced from its sulphide ores such as chalcopyrite by pyrometallurgical route, precious metals like gold and silver enter into the copper metal. During electrorefining of copper, these precious metals get collected into the anode slimes. These slimes are then made free from the associated selenium, tellurium and copper etc. and smelted in the Dore furnace to get the Dore Bullion containing gold and silver. During the smelting of the anode slimes, a portion of the gold and silver enter into the refractory bricks of the Dore furnace. At the end of their life cycle, the used refractory bricks are replaced with new bricks. Such used refractory bricks are also generated in gold production plants. The amount of gold and silver entering into the refractory bricks is substantial. A survey of published literature and patents does not disclose any solution to address the problem of recovering gold and silver from the used refractory bricks of Dore furnace generated in the processing of the anode slimes of copper industry, through a non-cyanide route.

OBJECTS OF THE INVENTION

The main object of the present invention is to provide a process for the recovery of gold and silver from the used refractory bricks of the Dore furnace, which obviates the drawbacks as detailed above.

Another object of the present invention is to provide a process for the recovery of gold and silver from the used refractory bricks of the Dore furnace generated during the processing of the anode of copper industry through a non-cyanide route.

SUMMARY OF THE INVENTION

Accordingly, the present invention provides a process for the recovery of gold and silver from the used refractory brick of the Due furnace which comprises.

(i) grinding used refractory bricks of the Dore furnace generated during the processing of the anode slimes of copper industry or from gold production plants to 80% to 200 mesh size (ii) roasting the ground refractory brick powder along with sodium chloride as an additive at a temperature in the range of 400–900° C.

(iii) leaching the said roasted powder with ammoniacal sodium thiosulphate solution at a temperature in the range of 40–90° C. for 4–10 hrs and separating the solids and liquid by filtration (iv) precipitating silver from the leached liquor obtained from step (iii) as silver sulphide and converting it to metallic silver by heating at a temperature in the range 600–800° C.

(v) leaching the solid residue obtained from step (iii with ammonium sulphate solution at a temperature in the range of 40–90° C. for 4–10 hrs to remove the acid consuming gangue constituents and filtering the solution (vi) leaching the solid residue obtaining from (v) with acidic thiourea solution in presence of ferric sulphate at a pH of 1 to 2.5 in the temperature range of 20–50° C. for 2–6 hrs and filtering (vii) mixing activated charcoal with the filtered leach liquor obtained from step (vi) and agitating for 1–2 hrs for adsorbing the gold onto the activated charcoal (viii) filtering the activated charcoal loaded with gold and incinerating it at a temperature of 700–800° C., for 2–3 hrs (ix) smelting the incinerated charcoal along with the metallic silver obtained from step (iv) to get gold-silver bullion and (x) parting gold and silver from the gold-silver bullion.

In an embodiment of the invention the ratio of the Dore furnace brick powder to the leachant used is in the range of 1:3 to 1:10.

In another embodiment of the invention, the sodium thiosulphate used for the leaching of silver has a concentration ranging between 5 g/l to 70 g/l.

In another embodiment of the invention the thiourea solution used for leaching the gold has a concentration ranging between 0.05 M to 2.0 M.

In yet another embodiment of the invention, the activated charcoal employed is selected from wood charcoal and coconut charcoal and used is in an amount in the range of 0.25 g/l to 10 g/l of the thiourea leach liquor.

In yet another embodiment of the invention the amount of ammonium sulphate employed to leach out the gangue constituents is in the range of 20 g/l to 100 g/l.

In still another embodiment of the invention, the amount of ferric sulphate used along with thiourea during the leaching in the range of 0.5 g/l to 10 g/l.

DETAILED DESCRIPTION OF THE INVENTION

The process of present invention involves in solubilizing the silver and gold from the used Dore furnace bricks with the help of two non-cyanide lixiviants such as sodium thiosulphate and thiourea respectively. The reactions involved in the recovery are given below:

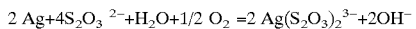

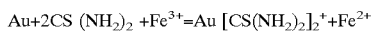

The silver is precipitated from the thosulphate leached solution as silver sulphide and then converted to metallic silver by heating. The gold dissolved in the thiourea solution is adsorbed onto activated charcoal. The loaded carbon after incineration is smelted along with the metallized silver obtained from thiosulphate leaching to get gold-silver bullion. From the mixed bullion, gold and silver are separated by parting.

The process gives a recovery of 94% of gold and 96% of silver from the used refractory bricks of the Dore furnace.

The novelty of the present invention is recovering gold and silver from the used refractory bricks of the Dore furnace with the help of environmentally safe reagents.

The following examples are given by way of illustration and therefore should not be construed to limit the scope of the present invention.

EXAMPLE 1

250 gms of the used Dore furnace refractory brick powder containing 135 gms/ton of gold and 3250 gms/ton of silver, 82% of MgO, 10% of $Cr_2O_3$, and 7.5% of $SiO_2$ was roasted at 750° C. in presence of 38g of sodium chloride as the additive for 2 hrs. in a muffle furnace and then leached with sodium thiosulphate solution having a concentration of 25 g/l presence of ammonia at a temperature of 60° C. for 5 hrs. After leaching, the solids and liquid were separated by filtration and from the leach liquor, silver was precipitated as silver sulphides and then converted to metallic silver by heating at 750° C.

The leach residue left after sodium thiosulphates leaching was further leached with ammonium sulphate solution having a concentration of 50 g/l at a temperature of 60° C. for 5 hrs to leach out the unwanted gangue constituents and after solid—liquid separation by filtration, the leach, residue was subjected to leaching ith acidic thiourea solution of 0.1 M concentration in presence of ferric sulphate (2.5 g/l) at a pH of around 1.5, for 4 hrs. After leaching, the solids and the thiourea leach liquor were separated by filtration and the leach liquor was mixed with 2.5 gms. Of activiated charcoal and agitated for 2 hrs in order to adsorb the gold the activated charcoal.

The activated charcoal loaded with gold was separated by filtration and was incinerated at 800° C. for 2 hrs and smelted along with the metallic silver obtained from the thiousulphate leaching and a gold—silver bullion was obtained.

The gold silver bullions was parted with nitric acid and gold and silver were obtained. The recoveries of gold and silver were 93% and 95% respectively.

EXAMPLE 2

500 gms of the used Dore furnace refractory brick powder of the same composition was roasted at 750° C. in presence of 75g of sodium chloride as the additive for 2 hrs. in a muffle furnace, and then leached with sodium thiosulphate solution having a concentration of 35 g/l in presence of ammonia at a temperature of 65° C. for 6 hrs. After leaching, the solids and liquid were separated by filtration and from the leach liquor, silver was precipitated as silver sulphide and then converted to metallic silver by heating at 750° C.

The leach residue left after sodium thiosulphate leaching was further leached with ammonium sulphate solution having a concentration of 50 g/l at a temperature of 60° C. for 5 hrs to leach out the unwanted gangue constituents and after solid—liquor separation by filtration. The leach residue was subjected to leaching with acidic thiourea solution of 0.2 M concentration in presence of ferric sulphate (2.5 g/l) at a pH of around 1.5, for 4 hrs. After leaching, the solids and the thiourea leach liquor were separated by filtration and the leach liquor was mixed with 5 gms. Of activated charcoal and agitated for 2 hrs. in order to adsorb the gold onto the activities charcoal.

The activated charcoal loaded with gold was separated by filtration and was incinerated at 800° C. for 2 hrs and smelted along with the metallic silver obtained from the thiosulphate leaching and a gold—silver bullion was obtained.

The gold-silver bullion was parted with nitric acid and gold and silver were obtained. The recoveries of gold and silver were 95% and 96% respective.

EXAMPLE 3

1000 gms of the used Dore furnace refractory brick powder having the same composition was roasted at 750° C. in presence of 150 gms of sodium chloride as the additive for 2 hrs. in a muffle furnace, and then leached with sodium thiousluphate solution having a concentration of 40 g/l in presence of ammonia at a temperature of 70° C. for 7 hrs. After leaching, the solids and liquid were separated by filtration and from the leach liquor, silver was precipitated as silver sulphide and then converted to metallic silvery by heating at 750° C.

The leach residue left after sodium thiosulphate leaching was further leached with ammonium sulphate solution having a concentration of 50 g/l at a temperature of 60° C. for 5 hrs to leach out the unwanted gangue constituents and after solid—liquid separation by filtration, the leach residue was subjected to leached with acidic thiourea solution of 0.25M concentration in presence of ferric sulphate (2.5 g/l (at a pH of around 1.5, for 4 hrs. After leaching, the solids and the thiourea leach liquor were separated by filtration and the leach liquor was mixed with 10 gms. Of activated charcoal and agitated for 2 hrs. in order to adsorb the gold onto the activated charcoal.

The activated charcoal loaded with gold was separated by filtration and was incinerated at 800° C. for 2 hrs and smelted along with the metallic silver obtained from the thiosulphate leaching and a gold—silver bullion was obtained.

The gold-silver bullion was parted with nitric acid and gold and silver were obtained. The recoveries of gold and silver were 94% and 97% respectively.

The Main Advantages of the Present Invention are

1. The process is very safe from the environmental point of view, because it uses only non-cyanide lixiviants for the leaching of gold and silver.
2. Quantitative recoveries of gold 94% and silver 96% can be obtained.
3. The process is very fast and can also be used for recovering gold and silver from the secondaries of gold producing and gold refining industries.

We claim:

1. A process for the recovery of gold and silver from the used refractory brick of the Dore furnace which comprises.
   (i) grinding used refractory bricks of the Dore furnace generated during the processing of the anode slimes of copper industry or from gold production plants to 80% to 200 mesh size
   (ii) roasting the ground refractory brick powder along with sodium chloride as an additive at a temperature in the range of 400–900° C.
   (iii) leaching the said roasted powder with ammoniacal sodium thiosulphate solution at a temperature in the range of 40–90° C. for 4–10 hrs and separating the solids and liquid by filtration
   (iv) precipitating silver from the leached liquor obtained from step (iii) as silver sulphide and converting it to metallic silver by heating at a temperature in the range 600–800° C.
   (v) leaching the solid residue obtained from step (iii with ammonium sulphate solution at a temperature in the range of 40–90° C. for 4–10 hrs to remove the acid consuming gangue constituents and filtering the solution
   (vi) leaching the solid residue obtaining from (v) with acidic thiourea solution in presence of ferric sulphate at a pH of 1 to 2.5 in the temperature range of 20–50° C. for 2–6 hrs and filtering (vii) mixing activated charcoal with the filtered leach liquor obtained from step (vi) and agitating for 1–2 hrs for adsorbing the gold onto the activated charcoal (viii) filtering the activated charcoal loaded with gold and incinerating it at a temperature of 700–800° C., for 2–3 hrs (ix) smelting the incinerated charcoal along with the metallic silver obtained from step (iv) to get gold-silver bullion and (x) parting gold and silver from the gold-silver bullion.

2. A process as claimed in claim 1 wherein the ratio of the Dore furnace brick powder to the leachant used is in the range of 1:3 to 1:10.

3. A process as claimed in claim 1 wherein the sodium thiosulphate used for the leaching of silver has a concentration ranging between 5 g/l to 70 g/l.

4. A process as claimed in claim 1 wherein the thiourea solution used for leaching the gold has a concentration ranging between 0.05 M to 2.0 M.

5. A process as claimed in claim 1 wherein the amount of ammonium sulphate employed to leach out the gangue constituents is in the range of 20 g/l to 100 g/l.

6. A process as claimed in claim 1 wherein the activated charcoal employed is selected from wood charcoal and coconut charcoal and used is in an amount in the range of 0.25 g/l to 10 g/l of the thiourea leach liquor.

7. A process as claimed in claim 1 wherein the amount of ferric sulphate used along with thiourea during the leaching in the range of 0.5 g/l to 10 g/l.

* * * * *